(12) United States Patent
Joynes

(10) Patent No.: US 6,288,973 B1
(45) Date of Patent: Sep. 11, 2001

(54) SENSOR SYSTEMS

(75) Inventor: George M. S. Joynes, Southampton (GB), SO16 7HJ

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 09/410,064

(22) Filed: Oct. 1, 1999

(30) Foreign Application Priority Data

Oct. 1, 1998 (GB) .................................................. 9821320

(51) Int. Cl.[7] .......................................................... G01S 3/80
(52) U.S. Cl. ............................ 367/118; 367/136; 367/128
(58) Field of Search ...................................... 367/131, 134, 367/135, 136, 2, 3, 4, 5, 128, 118

(56) References Cited

U.S. PATENT DOCUMENTS

| 4,371,957 | 2/1983 | Sandoz et al. |
|---|---|---|
| 4,406,242 * | 9/1983 | Weeks ................................. 114/242 |
| 4,639,900 | 1/1987 | Gustafson . |
| 4,737,938 * | 4/1988 | Grau ....................................... 367/21 |

FOREIGN PATENT DOCUMENTS 0 063 517 A1  10/1982  (EP) .
2 186 687 A   8/1987  (GB) .

* cited by examiner

Primary Examiner—Daniel T. Pihulic
(74) Attorney, Agent, or Firm—Crowell & Moring LLP

(57) ABSTRACT

An acoustic sensor system for the detection, location and classification of sound-generating targets, such as helicopters, from a ship includes a base station aboard the ship, having a radio transmitter/receiver (B-Tx/Rx) and a digital signal processor unit (DSP). A plurality of floating remote stations, which in use are positioned remotely from the ship, are each arranged to carry apparatus including an electrical power source, a radio transmitter/receiver (STx/Rx) suitable for two way communication with the B-Tx/Rx, a control unit, sound detectors, and a data processor (DP). The control unit is responsive to signals transmitted from the B-Tx/Rx and received by the S-Tx/Rx for controlling provision of electrical power for the apparatus. The DP is operative to classify electrical signals generated by the sound detectors in response to the reception thereby of sound signals, and to initiate, dependent upon classification, transmission of data from the S-Tx/Rx to the B-Tx/Rx appertaining to the sound signals. The DSP is operative, dependent upon reception of these signals from each of the remote stations, to generate data derived therefrom appertaining to the position and classification of the sound source.

13 Claims, 2 Drawing Sheets

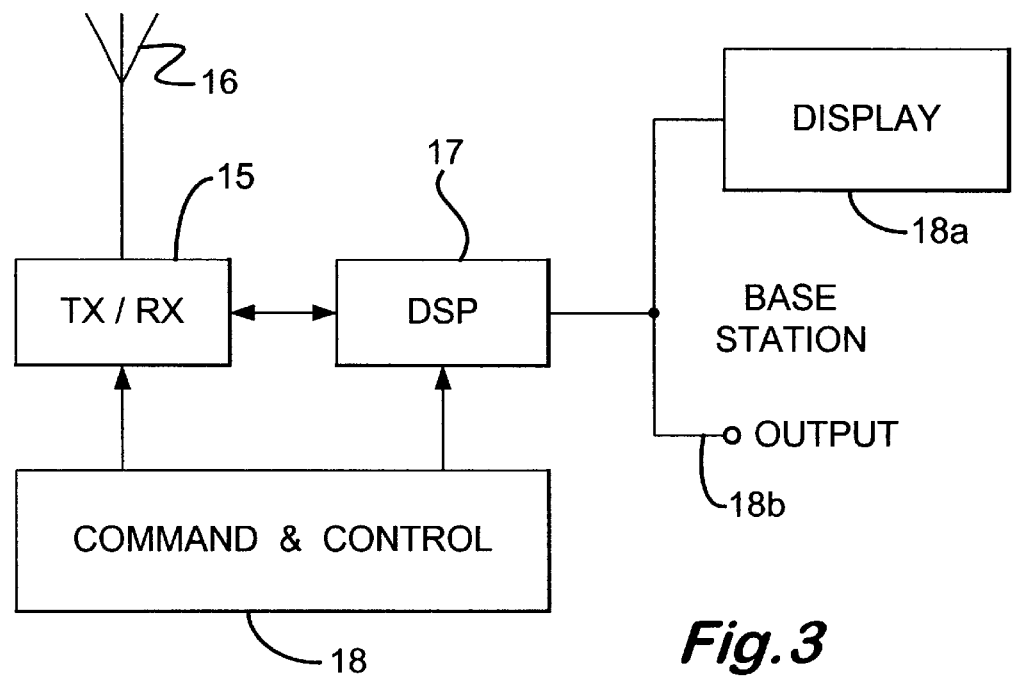
*Fig.3*
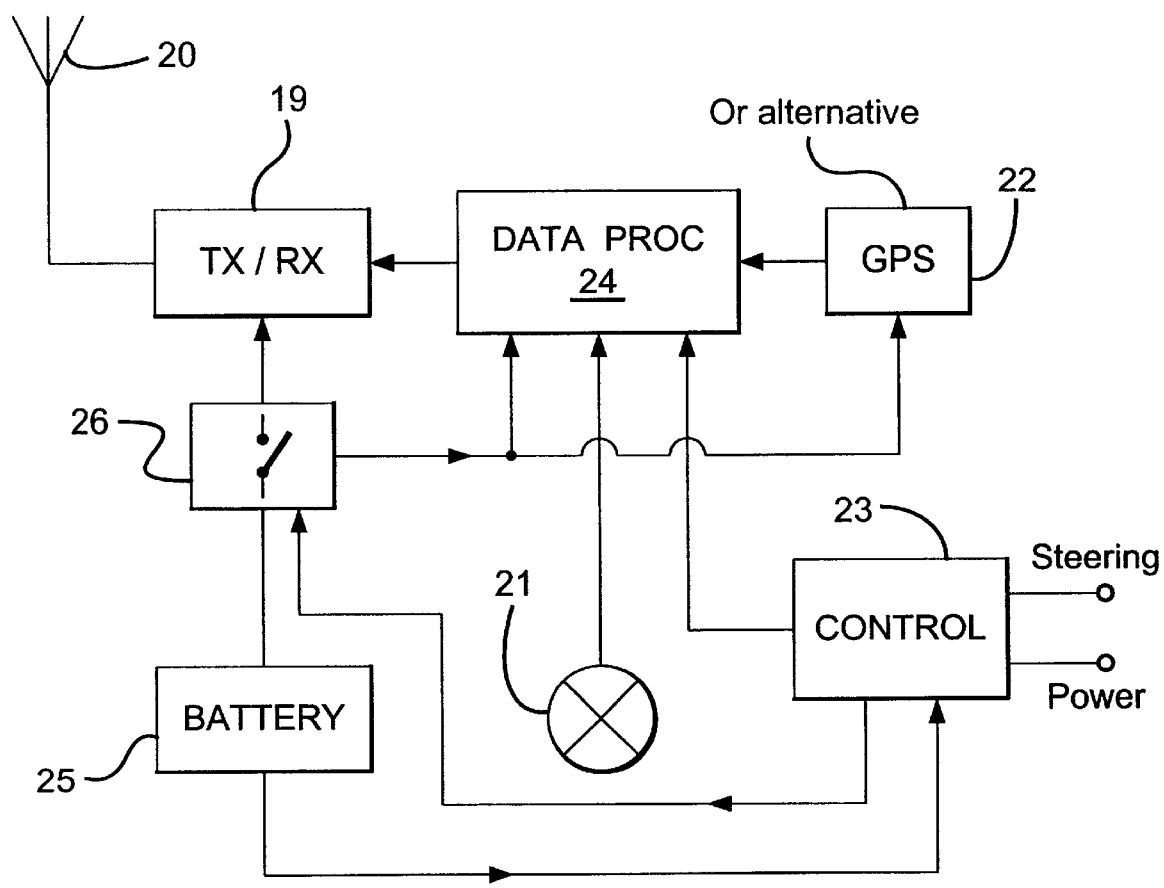
*Fig.4*   REMOTE STATION

SENSOR SYSTEMS

BACKGROUND AND SUMMARY OF THE INVENTION

This application claims the priority of British patent document 9821320.0, filed Oct. 1, 1998, the disclosure of which is expressly incorporated by reference herein.

This invention relates to sensor systems and more particular relates to acoustic sensor systems for naval applications.

Land based acoustic sensor systems for locating the position of guns for example, or other noise generators invisible to radar, by detection and analysis of the sound produced, are well known. However, a problem arises when attempting to use this technology for naval applications, since ships carrying the necessary equipment for identifying the location and classification of noise generating targets on or over land, must, in order for the equipment to be operationally effective, approach to within relatively close range of the noise source, whereby they become more vulnerable to attack. The early detection and location by surface vessels in littoral (coastal) waters, of missile-carrying hovering helicopters, which may briefly rise above vegetation or other coastal cover in order to launch a low level attack, is particularly desirable, given the vulnerability to such helicopters.

It is an object of this invention to provide an acoustic sensor system for naval use, which facilitates the detection, location and classification from ships, of noise-generating targets over land, wherein the aforementioned problem is largely overcome, or at least acceptably reduced.

According to the present invention an acoustic sensor system for the detection, location and classification of sound-generating targets from a ship comprises a base station aboard the ship which includes a radio transmitter/receiver (B-Tx/Rx) and a digital signal processor unit (DSP); and a plurality of floating remote stations which in use are positioned remotely from the ship, and which are each arranged to carry apparatus including an electrical power source, a radio transmitter/receiver (STx/Rx) suitable for two way communication with the B-Tx/Rx, control means, sound detector means, and a data processor (DP), the control means being responsive to signals transmitted from the B-Tx/Rx and received by the S-Tx/Rx for controlling provision of electrical power for the apparatus and the DP being operative to classify electrical signals generated by the sound detector means in response to the reception thereby of sound signals and operative to initiate in dependence upon classification, transmission of data from the S-Tx/Rx to the B-Tx/Rx appertaining to the sound signals, the DSP being operative in dependence upon reception of these signals from each of the remote stations, to generate data derived therefrom appertaining to the position and classification of the sound source.

The floating remote stations may be buoys which may be placed covertly by a small craft operating from the ship for example, or alternatively they may be small unmanned power driven boats, which will hereinafter be referred to as unmanned surface vessels or USVs, operated remotely under control of personnel aboard the ship and positionally controlled in dependence upon signals from the DSP at the base station which are fed via the control means at the remote station.

It will be appreciated that by deploying sound sensors which are positioned well away from the ship but in communication therewith, the advantages of location using acoustic sensor technology may be enjoyed without suffering the drawback of ship-mounting. Mounting microphones on a ship leads to two problems: (i) they will be a considerable distance from the target (say 5 km or more), and (ii) the local noise from the ship will significantly desensitise them, even after the application of noise reduction techniques. The many sources of reciprocating/rotating machinery on a ship will constitute a complex sound field, which Will be very difficult to reduce, automatically or manually.

The DP may comprise a simple threshold detector responsive only to signals above a predetermined threshold, this simple classification of received sound signals being enhanced by further processing in the DSP for target identification as well as target location i.e. determination of target bearing and range.

Alternatively, the DP may be arranged to carry out more sophisticated processing for many, or all aspects of target identification and location, as determined in accordance with the particular application in view. It may be desirable to enhance the capability of the DP so that signals in certain frequency bands or with other characteristics are either accepted or rejected at this early stage in the processing. This will enable some degree of data reduction before transmission back to the ship. It will however be apparent that since a plurality of remote stations are involved, in most cases it may be most appropriate to do the majority of the required processing at the base station.

The sound detector means may comprise at least one microphone sensor responsive to airborne sounds.

Additionally, an underwater sensor or sensors may be provided responsive to corresponding waterborne sounds the output of which may be used in combination with signals derived from the microphone sensor. The microphone sensor may comprise a single sensor.

Alternatively it may comprise an array having several microphone each of which may be supported on a boom or booms.

The remote stations may be provided with sensors responsive to radiation other than sound, i.e. infra-red radiation, the character of which may be analyzed and used as an additional information source or to supplement data derived from the sound sensor means.

Other objects, advantages and novel features of the present invention will become apparent from the following detailed description of the invention when considered in conjunction with the accompanying drawings.

BRIEF DESCRIPTION OF THE DRAWINGS

FIG. 3 is a block schematic circuit diagram of a base station for on a ship, and;

FIG. 4 is a block schematic circuit diagram of a remote statio use on a buoy or on a unmanned surface vessel.

DETAILED DESCRIPTION OF THE DRAWINGS

Acoustic sensing for the detection of targets has several advantages. It is essentially passive (i.e. it does not require the emission of radiation which could be detected by hostile systems); it can detect emissions from behind cover, since diffraction of sound is significant at the frequencies of interest; for helicopters it has a range of several kilometers, and it can provide target classification data and/or location data (albeit of relatively low resolution). These attributes make an acoustic sensor system an effective sensing system in its own right, and also a very useful adjunct or cueing system for other sensors, such as radar and optics/infrared.

Figure 1:
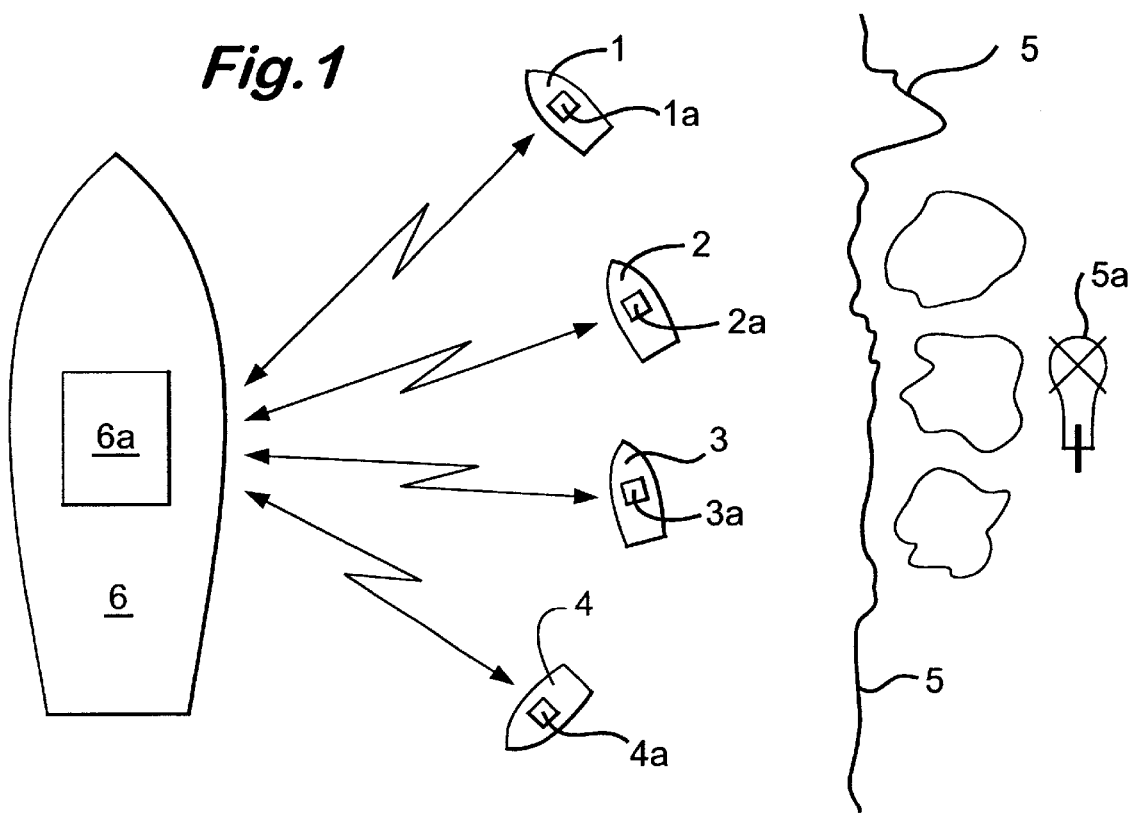
FIG. 1 is a schematic drawing of an acoustic sensor system for naval use.

In order to overcome problems described previously so that the beneficial features of acoustic detection may be enjoyed, a system as shown in FIG. 1 is provided which comprises a plurality of unmanned remote stations, 1a, 2a, 3a, and 4a, each of which is arranged to include one or more microphones, and other apparatus as will be hereinafter described, which remote stations are carried by unmanned surface vessels 1, 2, 3, and 4 respectively, deployed as close to a shoreline 5 as possible, from behind which a hostile hovering helicopter 5a may emerge. The remote stations 1a, 2a, 3a, and 4a, are controlled by a base station 6a which is carried by a ship 6 to be protected. Although the remote stations 1a, 2a, 3a, and 4a as shown in FIG. 1 are mounted on unmanned surface vessels, they may alternatively be mounted on buoys, which are preferably anchored and placed in position by a small boat launched from the ship 6 for this purpose.

By mounting each of the remote stations 1a, 2a, 3a, and 4a, on a buoy or on a relatively small, remotely controlled maneuverable vessel or unmanned surface vessel, rapid forward deployment can readily be achieved. Even a small unmanned surface vessel is capable of carrying a substantial load of batteries, and equipment such as a transmitter/receiver etc., and could be designed to have considerable endurance. It is believed that such unmanned surface vessels would be difficult to detect, and could be designed to withstand a wide range of sea states and conditions.

Figure 2A:
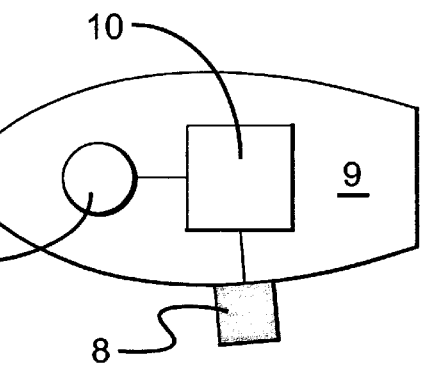
FIG. 2a is a schematic drawing of a unmanned surface vessel for use in the system of FIG. 1 and having two different sensors.

The remote stations 1a, 2a, 3a, and 4a, may each be arranged to include a microphone 7 and additionally one or more hydrophones 8, as shown schematically in FIG. 2a mounted on a unmanned surface vessel 9, for the detection of airborne sounds and corresponding waterborne sounds respectively, which originate from a common sound source, signals from the microphone 8 and the hydrophone 9 being fed to a data processor 10 to be used for target detection and/or target classification purposes.

Figure 2B:
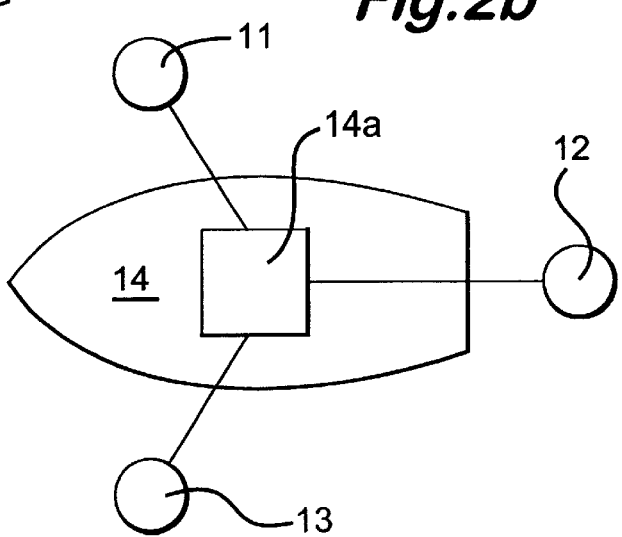
FIG. 2b is a schematic drawing of a unmanned surface vessel for use in the system of FIG. 1 and having three similar sensors.

Alternatively as shown in FIG. 2b, three microphones 11, 12, 13, may be provided, which in combination form a boom mounted array thereby to provide an extended baseline, and which are carried on one unmanned surface vessel 14 and arranged to feed a data processor 14a. In a modified embodiment, the microphones 11, 12, 13, may be used in combination with a hydrophone as shown in FIG. 2 and may not necessarily be boom mounted. It will be appreciated that if only detection of a hidden/approaching helicopter only is required, then one such array is needed. However more information will be required if the location of the helicopter is also to be provided, which information might be provided by the sensors of three or more floating remote stations. Because each microphone is essentially isotropic in its polar diagram, it is not necessary to correct for the roll, pitch and yaw of floating remote stations. It is just necessary to monitor their positions in the plane of the sea surface, and in particular their relative positions, to the required accuracy.

Although some error in angle of arrival would result from relative vertical movement of the floating remote stations due to wave motion, with appropriate mutual spacing of floating remote stations this would not be a problem. Widening the effective spacing of the microphones from what is available with booms has other advantages in terms of accuracy, as long as the coherence of the signal is good enough and/or the noise is de-correlated, the latter obviously getting better the larger the spacing.

Referring now to FIG. 3, the base station 6a as shown in FIG. 1 comprises a base station Tx/Rx (B-Tx/Rx) 15, coupled to a Tx/Rx antenna 16, a DSP 17, a command/control system 18, a display 18a, and an output signal port 18b. The B-Tx/Rx 15, is used to transmit to the remote stations 1a, 2a, 3a 4a, as shown in FIG. 1 for example, instructions from the command/control system for controlling the position and operation of the remote stations as necessary. In this respect it will be necessary for the system to know the positions and orientations of the unmanned surface vessels 1, 2, 3 4, which carry the remote stations 1a, 2a, 3a, 4a, and to correct for vessel movements, including pitch and roll. No attempt would be made to counteract movements of the vessels themselves, but the data gathered from each would be corrected to enable accurate computations to be made. Although this could be carried out locally by apparatus aboard the unmanned surface vessels 1, 2, 3, 4, it might preferably be under the overall control of the DSP 17, on the ship 6, so that each remote station 1a, 2a, 3a, 4a, is arranged to transmit its data either in real time, or from storage, on command. For this purpose time synchronizing signals can be transmitted from the base station 6a, on the ship 6, to the remote stations 1a, 2a, 3a, 4a, which may then be operated in a time division multiplex mode.

As shown in FIG. 4, the remote stations may each comprise a remote station transmitter/receiver (S-Tx/Rx) 19, coupled to a Tx/Rx antenna 20, a sound detector means 21, a GPS system 22, a control system 23, a data processor 24, and a battery power source 25 (which may alternatively be a petrol or diesel generator), power from which is fed via a switch 26, to the Tx/Rx 19, the DP 24 and the GPS system 22, the control system also being arranged to control unmanned surface vessel engines and steering in a conventional manner. It will be appreciated that although in this embodiment a GPS system 22 is used, in alternative embodiments any other suitable system for position determination may be used.

For the purpose of position determination other options are possible and if the remote station is entirely (or almost entirely) controlled from the ship it may carry a passive reflector which renders it visible to apparatus carried by the ship such as radar or lidar for position determination purposes. However this is probably not preferred since the remote stations themselves may then be detectable by hostile sensors.

As already mentioned, it may be feasible to deploy other sensors on these small or even miniature unmanned surface vessels, and to combine their outputs to enhance detection capabilities.

Even with acoustic sensors alone, other targeting functions may be carried out. One such function is the location of guns and fall of shot, on sea and on land adjacent to the coast. This may be useful in times of land bombardment, or when naval ships are being shelled from land.

The techniques of target classification and/or location by means of sound analysis are well understood by those skilled in the art. Accordingly, a detailed further discussion herein of these techniques and the apparatus used for their implementation is unnecessary.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. An acoustic sensor system for the detection, location and classification of sound generating targets from a ship comprising:

a base station aboard the ship, including a first radio transmitter/receiver and a digital signal processor unit; and a plurality of floating remote stations which are adapted to be positioned remotely from the ship, and which are each arranged to carry apparatus including an electrical power source, a second radio transmitter/receiver suitable for two way communication with the first radio transmitter/receiver, a control unit, a sound detector, and a data processor, wherein:

the control unit is responsive to signals transmitted from the first radio transmitter/receiver and received by the second radio transmitter/receiver for controlling provision of electrical power for the apparatus;

the data processor is operative to classify electrical signals generated by the sound detector in response to the reception thereby of sound signals from a sound source, and to initiate in dependence upon classification, transmission of data signals from the second radio transmitter/receiver to the first radio transmitter/receiver appertaining to the sound signals; and the digital signal processor is operative, based upon data signals received from each of the remote stations, to generate data derived therefrom appertaining to position and classification of the sound source.

2. An acoustic sensor system as claimed in claim 1 wherein the floating remote stations are buoys.

3. An acoustic sensor system as claimed in claim 1, wherein:

the data processor comprises a threshold detector that is responsive only to signals above a predetermined threshold; and classification of received sound signals is enhanced by further processing in the digital signal processor for target identification and/or target location.

4. An acoustic sensor system as claimed in claim 1, wherein the floating remote stations are small unmanned power driven boats or unmanned surface vessels, operated remotely under control of personnel aboard the ship and positionally controlled by control signals from the digital signal processor at the base station, which control signals are fed via the control unit at the remote station.

5. An acoustic sensor system as claimed in claim 1, wherein the data processor includes means to carry out data processing for at least some aspects of target identification and location.

6. An acoustic sensor system as claimed in claim 1, wherein the sound detector comprises at least one microphone sensor responsive to airborne sounds.

7. An acoustic sensor system as claimed in claim 6, wherein:

the sound detector further comprises at least one underwater hydrophone sensor responsive to waterborne sounds;

the output of said at least one hydrophone sensor is analyzed in combination with signals derived from the microphone sensor.

8. An acoustic sensor system as claimed in claim 7, wherein the at least one hydrophone sensor comprises an array of individual hydrophones.

9. An acoustic sensor system as claimed in claim 6, wherein the microphone sensor comprises a single microphone.

10. An acoustic sensor system as claimed in claim 6, wherein the microphone sensor comprises an array having a plurality of microphones.

11. An acoustic sensor system as claimed in claim 10, wherein said array comprises a plurality of microphones deployed on booms.

12. An acoustic sensor system as claimed in claim 1, wherein:

the remote stations comprise sensors that are responsive to radiation other than sound; and said radiation other than sound is analyzed and used as an additional information source to supplement data derived from the sound sensor.

13. An acoustic sensor system according to claim 12, wherein said radiation other than sound is infrared radiation.

* * * * *